(12) United States Patent
Ghazzawi

(10) Patent No.: US 9,910,410 B2
(45) Date of Patent: Mar. 6, 2018

(54) MULTI-INPUT MULTI-OUTPUT CONTROL SYSTEM AND METHODS OF MAKING THEREOF

(71) Applicants: SAUDI BASIC INDUSTRIES CORPORATION, Riyadh (SA); SABIC GLOBAL TECHNOLOGIES B.V., Bergen op Zoom (NL)

(72) Inventor: Yousof Mustafa Ghazzawi, Riyadh (SA)

(73) Assignees: SABIC GLOBAL TECHNOLOGIES B.V., Bergen op Zoom (NL); SAUDI BASIC INDUSTRIES CORPORATION, Riyadh (SA)

( * ) Notice: Subject to any disclaimer, the term of this patent is extended or adjusted under 35 U.S.C. 154(b) by 0 days.

(21) Appl. No.: 15/117,495

(22) PCT Filed: Feb. 6, 2015

(86) PCT No.: PCT/EP2015/052532
§ 371 (c)(1),
(2) Date: Aug. 9, 2016

(87) PCT Pub. No.: WO2015/121169
PCT Pub. Date: Aug. 20, 2015

(65) Prior Publication Data
US 2016/0349715 A1 Dec. 1, 2016

(30) Foreign Application Priority Data
Feb. 11, 2014 (EP) .................................. 14154673

(51) Int. Cl.
G06F 19/00 (2011.01)
G05B 11/42 (2006.01)
G05B 11/32 (2006.01)
B64C 39/02 (2006.01)

(52) U.S. Cl.
CPC ............ G05B 11/42 (2013.01); B64C 39/024 (2013.01); G05B 11/32 (2013.01); B64C 2201/141 (2013.01); G05B 2219/13095 (2013.01); G05B 2219/2637 (2013.01); G05B 2219/34025 (2013.01); G05B 2219/42017 (2013.01)

(58) Field of Classification Search
CPC ........ G05B 11/42; G05B 11/32; B64C 39/024
See application file for complete search history.

(56) References Cited

U.S. PATENT DOCUMENTS

| | | | | |
|---|---|---|---|---|
| 6,055,524 A * | 4/2000 | Cheng | ................... | G06N 3/0635 706/14 |
| 6,697,767 B2 * | 2/2004 | Wang | ................... | G05B 13/042 702/179 |
| 7,035,694 B2 * | 4/2006 | Ramamoorthy | ..... | G05B 13/042 700/13 |
| 7,694,305 B2 * | 4/2010 | Karlsson | ............. | G06F 11/3409 709/224 |
| 2002/0111758 A1 * | 8/2002 | Wang | ................... | G05B 13/042 702/79 |
| 2004/0230325 A1 * | 11/2004 | Ramamoorthy | ..... | G05B 13/042 700/37 |
| 2006/0090163 A1 * | 4/2006 | Karisson | ............. | G06F 11/3409 718/105 |

OTHER PUBLICATIONS

Han, Jingqing. "From PID to active disturbance rejection control." IEEE transactions on Industrial Electronics 56.3 (2009): 900-906.*
Bi, Qiang, et al. "Advanced controller auto-tuning and its application in HVAC systems." Control Engineering Practice 8.6 (2000): 633-644.*
Gao, Zhiqiang. "Active disturbance rejection control: a paradigm shift in feedback control system design." American Control Conference, 2006. IEEE, 2006.*
Dawes, et al., "Design of Deadbeat Robust Systems", Proceedings of the Third IEEE Conference on Glasgow, UK, 1994, vol. 3, pp. 1597-1598.
International Search Report for International Application No. PCT/EP2015/052532; dated Apr. 15, 2015; 3 pages.
Kada et al., "Robust PID controller Design for an UAV Flight Control System"; World Congress of Engineering and Computer Sicence, 2011, vol. II, Oct. 19-21, San Francisco, USA, 6 pages.
Prasad et al., "New Computing Technique for order Reduction on Linear Time invariant Systems using Stability Equation Method", Journal of the Institution of Engineers IE(I), Journal EL, vol. 86, Sep. 2005, pp. 133-135.
Turkoglu et al., "PID Parameter Optimization of an UAV Longitudinal Flight Control System", World Academy of Science, Engineering and Technology, 2008, vol. 21, pp. 340-345.
Wen et al., "Decoupling Control of a Twin Rotor MIMO System using a Robust Deadbeat Control Technique", The Institution of Engineering and Technology, 2008, vol. 2, Issue 11, pp. 999-1007.
Written Opnion of the International Search Report for International Application No. PCT/EP2015/052532; dated Apr. 15, 2015; 5 pages.

(Continued)

Primary Examiner — Michael D Masinick
(74) Attorney, Agent, or Firm — Cantor Colburn LLP

(57) ABSTRACT

The invention provides a multi-input multi-output (MIMO) control system comprising a controller adapted for receiving an input set of at least two control input parameters and a set of at least two control output parameters, said control system arranged for effecting a modified deadbeat control, in which said modified deadbeat control comprises a robust deadbeat control for an n-th order, linear time invariant (LTI) system based upon a series of cascade proportional integrating-differentiating (PID) controls, each PID control comprising a system transfer function having a nominator and a denominator, wherein for the nominator a constant gain (K) is selected for each PID control. The invention further provides a method for controlling a continuous process using this control system.

13 Claims, 4 Drawing Sheets

(56) References Cited

OTHER PUBLICATIONS

Kada et al., "Robust PID Controller Design for an UAV Flight Control System"; Wcecs 2011: Proceedings of the World Congress on Engineering and Computer Science, 2011, vol. II Oct. 19-21, San Francisco.

* cited by examiner

MULTI-INPUT MULTI-OUTPUT CONTROL SYSTEM AND METHODS OF MAKING THEREOF

CROSS REFERENCE TO RELATED APPLICATIONS

This application is a 371 of International Application No. PCT/EP2015/052532, filed Feb. 6, 2015, which claims priority to European Application No. 14154673.9, filed Feb. 11, 2014 both which are incorporated herein by reference in their entirety.

FIELD OF THE INVENTION

The invention relates to a control system, a method for controlling a process, and to a computer program product.

BACKGROUND OF THE INVENTION

Control systems for controlling processes are known in the art. Control system requirements have increased in recent years. It was found that a PID controller is not good enough in its current form to handle those requirements. Therefore, the use of nonlinear controllers had become a must. Even though the nonlinear controller is very complicated and cannot be applied on some systems.

A problem in a PID controller is that it has a number of control loops (often three or four loops) and for each loop, there are three parameters that needs tuning which may need days of tuning to reach an acceptable performance. Even after all that tuning effort, the performance may still not matching the performance of a nonlinear controller. Some controller allow a reduction of the number of tuning parameters (Deadbeat, Zeigler-Nichols) but without being able to make any change on the number of control loops.

In 1980s, a deadbeat controller was developed in order to decrease the number of tuning parameters. However, it was only applicable with discrete time control. In 2008, an application with a deadbeat controller was presented which allowed continuous time control. See, for instance, Peng Wen and Te-Wei Lu, Decoupling Control of a Twin Rotor MIMO System using Robust Deadbeat Control Technique, proceeding of: Control and Automation, 2007. ICCA 2007. IEEE according to which it "studies the decoupling control of a twin rotor MIMO system and proposes to apply robust deadbeat control technique to this nonlinear system. Firstly, the nonlinear problem is identified and system model is developed. Then we show that the system is able to be decoupled into two SISO systems, and the crossing couplings can be considered as disturbances to each other. Finally we apply a robust deadbeat control scheme to the two SISO systems and design a controller for each of them. This design is evaluated in simulations, and the final result is tested in a twin rotor MIMO system. Comparing with a traditional system with two PID controllers, this method is easy to follow, and the results show that the proposed scheme has less overshoot, shorter settling time and more robust to crossing coupling disturbances." Thus, a deadbeat controller was applied in continues form on a Multi Input Multi Output (MIMO) system. Nonetheless, it was applied on modified system transfer function. Therefore, it is considered insufficient since any modification on the system usually lead to high margin of error. The publication does not explain the system, and a system order reduction was applied as the real system (which is not true) changing any part of the system is basically ignoring a part of that system like if it does not exist. System mathematical model is a representation of the system component. Any change to the mathematical model has to be done very carefully and has to be explained very well. Most of the time, when changing a part of the system in simulation, it well lead to serious control problems. It can also lead to system failure.

In 'PID Parameter Optimization of an UAV Longitudinal Flight Control System', Kamran Turkoglu, Ugur Ozdemir, Melike Nikbay, and Elbrous M. Jafarov, World Academy of Science, Engineering and Technology 21, 2008, pp. 340-345, According to which "an automatic control system design based on Integral Squared Error (ISE) parameter optimization technique has been implemented on longitudinal flight dynamics of an UAV. It has been aimed to minimize the error function between the reference signal and the output of the plant. In the article, objective function has been defined with respect to error dynamics. An unconstrained optimization problem has been solved analytically by using necessary and sufficient conditions of optimality, optimum PID parameters have been obtained and implemented in control system dynamics."

Drawbacks make these controllers and/or algorithms used in these controllers less suited for continuous systems, or make these controllers complicated because of the number of loops that these controllers require. For instance, the number of gains and other settings that need to be tuned in know controllers makes these controllers difficulty, if not impossible, to apply to real processes.

SUMMARY OF THE INVENTION

Hence, it is an aspect of the invention to provide a control system based upon a control algorithm which preferably at least partly obviates one or more of above-described drawbacks. In an embodiment, the number of settings is reducing. In another or alternative embodiment or additionally, the complexity of the controller may be reduced by reducing the number of control loops.

The invention thus provides a multi-input multi-output (MIMO) control system comprising a controller adapted for receiving an input set of at least two control input parameters and a set of at least two control output parameters, said control system arranged for effecting a modified deadbeat control, in which said modified deadbeat control comprises a robust deadbeat control for an n-th order, linear time invariant (LTI) system based upon a series of cascade proportional integrating-differentiating (PID) controls, each PID control comprising a system transfer function having a nominator and a denominator, wherein for the nominator a constant gain (K) is selected for each PID control.

Here, a deadbeat controller is modified to make it suitable for continuous time, and to reduce the number of control loops from three or four loops to one control loop only. In order to do that:

The deadbeat equation was modified to make it applicable for continues systems, see (B. Kada, Y. Ghazzawi, Robust PID controller Design for an UAV Flight Control System, Proceedings of the world Congress on Engineering and Computer Science 2011 Vol II, Oct. 19-21, 2011, San Francisco, USA. This publication is incorporated by reference as if fully set forth.

Then the control system is further modified to decrease the number of loops from three or four loops to one loop only. The modification was to use system order reduction associated with deadbeat controller and then apply the controller on the real system model after getting the control parameters from the reduced model The number of loops can be reduced because the same PID controller is repeated in three or more loops (usually, each loop has its own PID, which means that three loops will have tree PIDs, but in this method, three or more loops can be controlled using only one PID controller These three steps in combination were found to reduce the tuning time by 90%. Furthermore, the combination allowed a performance that is much better than any linear controller. This will be demonstrated in examples, showing the application of the control system on a UAV flight control system.

The current controller can be applied using two different methods: 'system order reduction' and 'zero gain replacement'. The fundamentals will be explained below.

In both methods, 'system order reduction' and 'zero gain replacement', the change in the system transfer function is temporary to find the values of the control parameters only, while the controller subsequently is applied to the real unmodified system.

It was found that the controller works perfectly even in the case of parameters uncertainty and external disturbances. The controller can be applied to complicated high order nonlinear systems.

In an embodiment, the denominator is set functionally equal for each PID control. This will help maintaining the stability of the systems.

In an embodiment, for each PID control, the gain (K) is set functionally equal. In fact, the gain (K) is not set absolutely equal. In my work, I found out that K for each transfer function in the system is close in value. It is close enough to an extend that in practical situations, we can assume it is equal. This will help maintaining the same nominator for all loops In an embodiment, at least one PID controller is provided for each input.

In an embodiment, said control system comprises a continuous time base. This will make the control freedom of the system almost unlimited.

In an embodiment, said control system can be applied on nonlinear systems. This will widen the range of applications In an embodiment, the system transfer functions of said PID controls are defined as $q(s)/p(s)$, wherein $q(s)$ and $p(s)$ are polynomials, wherein $q(s)$ is selected as a constant gain K, and $p(s)$ is a polynomial with deadbeat parameters. This will make the transfer function for all loops almost or functionally the same.

In an embodiment, said denominator is a polynomial, in particular a Hurwitz polynomial. A Hurwitz polynomial, known as such, is a polynomial of the form $SUM(a_i \cdot s_i)=0$ having $a_i>0$. The roots all have negative real parts if all the determinants $$a_1, \begin{vmatrix} a_1 & a_0 \\ a_3 & a_2 \end{vmatrix}, \begin{vmatrix} a_1 & a_0 & 0 \\ a_3 & a_2 & a_1 \\ a_5 & a_4 & a_3 \end{vmatrix}, \ldots$$

are positive where, in writing down the determinants, $a_r$ is put equal to zero if $r>n$.

In an embodiment, said control system comprises a disturbance $d(t)$ which is a function of time, and a size of said disturbance is less or equal to a maximum disturbance dmax. The system is proven to be robust against external disturbances and model uncertainties.

In an embodiment, the same PID is used in each loop, minimizing the decoupling effect. Thus, less effort needs to be applied and less time is needed for tuning.

The invention further relates to a method for controlling a continuous process, in particular a chemical process, more in particular a polymerization reaction, said method comprising:
  providing a control system according to the invention;
  providing a chemical processing assembly running a chemical process, said chemical process assembly comprising a series of actuators for setting a series of process conditions of said chemical process;
  determining during said chemical process a series of process output parameters and providing these output parameters to the control system;
  said control system determining a set of process input parameters resulting from said process output parameters;
  said control system providing said input parameters to said actuators during said chemical process for setting said process conditions.

In an embodiment of the method, said chemical process is a continuous polyolefin polymerization reaction.

In an embodiment of the method, the actuators are selected from the group consisting of a material feeder, a cooler, a heater, one or more pressure valves.

In an embodiment of the method, said process output parameters are selected from the group consisting of temperature, pressure, flow rate, viscosity, molecular weight, one or more UV, VIS or IR spectral values, branching index, and a combination thereof.

The invention further relates to a computer program product which, when running on a computer system, adapts said computer system to implement said controller of said control system on said computer system.

The invention further relates to a data carrier comprising the computer program product.

The invention further relates to a carrier signal comprising a signal coding for the computer program product.

The control system con be applied to chemical processes. For instance, the control system can be applied to polymerization processes. For example, the control system can be used to control a polymerization reactor of a polyolefin plant. Such polymerization reactors are usually operated in a continuous operation, whereby important parameters of the polymerization process need to be controlled in order to make the right polymer having the right parameters, Examples of important parameters are molecular weight, molecular weight distribution, melt flow, co-monomer composition, branching index and the like. For example in order to control the molecular weight of a polymer (like polyethylene or polypropylene), hydrogen is often used as a chain transfer agent. The concentration of hydrogen is one of the factors for controlling the molecular weight of a polymer, But at the same time, more parameters influence the molecular weight of the polymer formed. These parameters can be measured directly, and are used as input in the control system of the present invention. For example parameters that can be directly measured are polymerization temperature, monomer concentration in the feed and in the polymerization reactor, reactor pressure, viscosity of the polymerization reaction medium and calculated parameters are monomer conversion and co-monomer ratio, in case more than one monomer are being used. In order to obtain (for example) a certain molecular weight, several parameters need to be controlled, that all have an influence on the molecular weight. With the control system of the present invention, the control of the polymerization reaction can be performed much easier thereby creating less off-spec product and higher yields.

The same mechanisms can be used in other chemical reaction systems. For instance, the control system can be adapted for controlling polymer processing. The control system can be used for batch and/or continuous processes. Input parameters that can be used as at least part of the input for the control system are for instance selected from the group consisting of viscosity, chemical composition, molecular weight, particle size, temperature, pressure.

Examples of polymerization reactions are solution (co)polymerization, emulsion (co)polymerization, radical (co)polymerization, and addition polymerization.
   optical analysis using UV, VIS, IR
   on-line measurements of polymer architecture such as composition, molecular weight and degree of branching In an embodiment, the control system can be adapted for controlling reactors, extruders, mixers, and the like in polymer processing. In these processes, performance can be optimized for the best speed, temperature, pressure, composition, properties, and a combination thereof. The control system may also be adapted for controlling processes involving injection moulding, blow moulding, sheet extrusion, and the like. The control system of the current invention can save money, or to get a better performance or both at the same time.

The term "substantially" herein, such as in "substantially consists", will be understood by the person skilled in the art. The term "substantially" may also include embodiments with "entirely", "completely", "all", etc. Hence, in embodiments the adjective substantially may also be removed. Where applicable, the term "substantially" may also relate to 90% or higher, such as 95% or higher, especially 99% or higher, even more especially 99.5% or higher, including 100%. In this respect, the term "functionally" in combinations like "functionally rectangular" is to be understood by the skilled person to differ so little from actually being rectangular that something functions the same as if it were actually rectangular.

The term "comprise" includes also embodiments wherein the term "comprises" means "consists of".

Furthermore, the terms first, second, third and the like in the description and in the claims, are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein.

The devices or apparatus herein are amongst others described during operation. As will be clear to the person skilled in the art, the invention is not limited to methods of operation or devices in operation.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. Use of the verb "to comprise" and its conjugations does not exclude the presence of elements or steps other than those stated in a claim. The article "a" or "an" preceding an element does not exclude the presence of a plurality of such elements. The invention may be implemented by means of hardware comprising several distinct elements, and by means of, or including, a suitably programmed computer. In the device or apparatus claims enumerating several means, several of these means may be embodied by one and the same item of hardware. The mere fact that certain measures are recited in mutually different dependent claims does not indicate that a combination of these measures cannot be used to advantage.

The invention further applies to an apparatus or device comprising one or more of the characterising features described in the description and/or shown in the attached drawings. The invention further pertains to a method or process comprising one or more of the characterising features described in the description and/or shown in the attached drawings.

The various aspects discussed in this patent can be combined in order to provide additional advantages. Furthermore, some of the features can form the basis for one or more divisional applications.

BRIEF DESCRIPTION OF THE DRAWINGS

Embodiments of the invention will now be described, by way of example only, with reference to the accompanying schematic drawings in which corresponding reference symbols indicate corresponding parts, and in which:

FIG. 3 is for order reduction, FIG. 6 is for zero gain replacement to the set point of 20 degrees as desired pitch angle.

DESCRIPTION OF PREFERRED EMBODIMENTS

In many MIMO systems, the control can be defined using a set of Proportional Integrating Differentiating loops, or PID's. In such a system, A system transfer function can be defined:

$$G(s) = \frac{\Sigma a_i s^i}{\Sigma b_i s^i}$$

Figure 1:
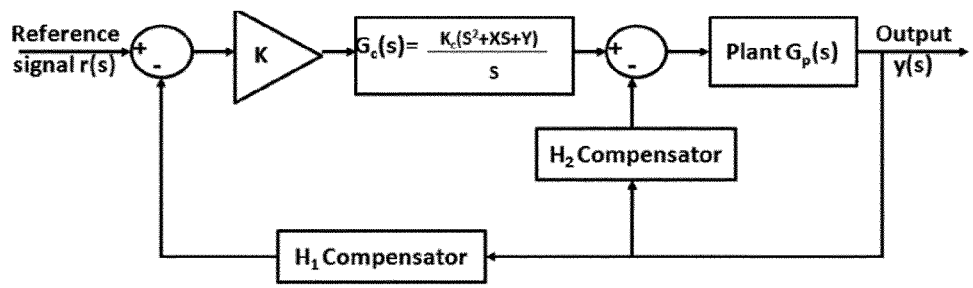
FIG. 1 schematically depicts an example of a deadbeat controller.

In any system transfer function, there thus is a nominator and denominator. The difference between the order of the denominator (od) and the order of the nominator (on) is usually from 0 to 2 (n). In FIG. 1, an example of a Deadbeat control system is shown. After studying the deadbeat system, it was found that deadbeat equation is only applicable if od-on≤3. A technique which is called "System order reduction" may be applied on the nominator of the system in order to increase the order difference (n) from 2 to 3. Afterwards, in addition or alternatively, the idea of replacing the whole nominator with a "gain", a constant K, came to me. It was also applied successfully.

In a MIMO system which has multiple inputs and multiple outputs, various system loops can be combined. It was noticed that in these systems, the different system loops have the same denominator.

So, in an embodiment, if a system order reduction was applied, the nominator order can be reduced to zero. Thus, system order reduction can make the difference between the nominator and the denominator more than two. Since the order of nominator becomes zero and taking in consideration that all system transfer functions have the same denominator, it follows that the modified transfer function becomes the same for all system loops.

In another or further elaborated embodiment, It was found that if the nominator can be replaced with a "gain" and in particular if that "gain" is the same for all system loops, taking in consideration that it also has the same denominator, then it follows that the modified transfer function becomes the same for all system loops.

Figure 2:
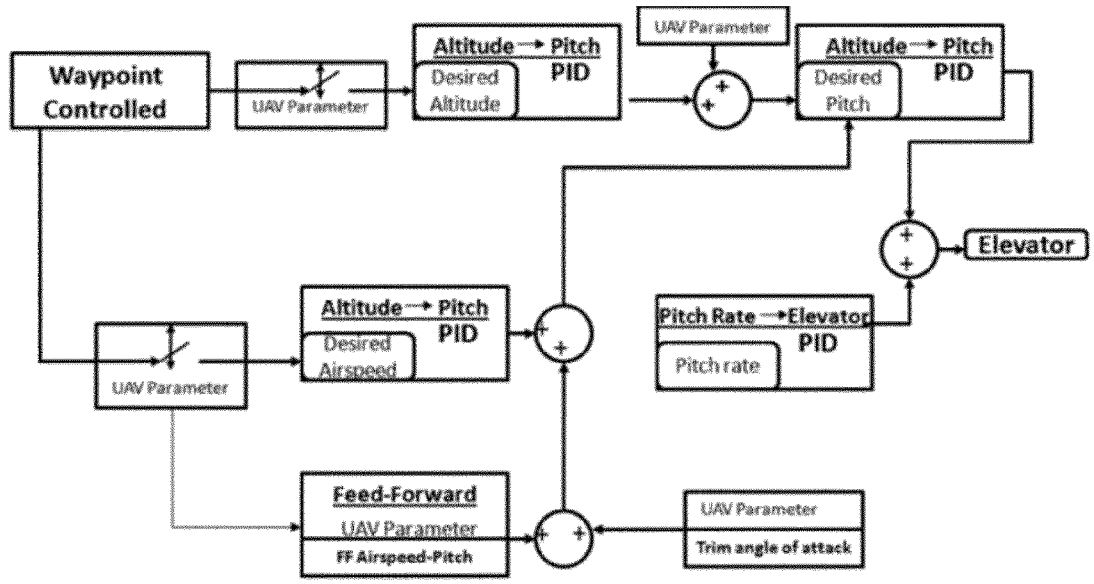
FIG. 2 shows an example of a four-loop control system, which are desired pitch, desired airspeed, pitch rate, trim angle of attack.

Therefore, with either one of these embodiments or a combination thereof, it is possible to solve all the system loops at once instead of solving for each loop individually (like in the classic PID and deadbeat controller). The controller can then be applied on the original transfer function, which means that there will be no effect on the system behaviour. For a four-loop system (see FIG. 2, for instance), originally 12 gains needed to be tuned (no. loops*no. gains in each loop=4*3=12). While after the modification suggested, only one "gain" (and none for some systems) needs to be tune. This means that the number of gains that need to be tuned is reduced with more than 90%! Applying this controller will mean a huge saving and amazing system performance.

An example of several approaches to the current control system will be demonstrated, applied to UAV autopilot tuning. It is a system of a small UAV used for research purposes. The system state space representation has four loops associated with it, which are: Air speed, speed in z direction, angle of attack, pitch angle.

Usually, there are nine system loops to be tune for a complete autonomous flight of a UAV. To tune those classical nine system loops with the usual three gains for each PID controller (referred to as KP, KI, and KD), a vast amount of man power and time is needed. Applying a deadbeat controller (known as such, see Jay Dawes et al., "Design of Deadbeat Robust Systems", Glasgow, UK, pp 1597-1598, 1994), the three gain parameters of each PID controller were reduced to only 1 parameter. This means that for the usual 9 system loops, we now have to tune only 9 gains instead of the original 9×3=27 gains. This means that the number of required tuning parameters was decreased by 66.7%.

It will be demonstrated that using the current control system, the number of tuning parameters can be reduced even further. Since the number of loops may be reduced as well, the number of tuning parameters can eventually be reduced to 1×1=1 parameter only. This means that the number of tuning parameters cab be reduced by 96.5%.

Thus, a control system can be implemented using modified PID controllers using a technique which we will refer to as "system order reduction", and/or a technique we will refer to as "zero gain replacement". It is possible to combine these techniques.

In this example, first we will demonstrate the control system using system order reduction.

Any aerial system is represented by three motions, which are pitch, roll, and yaw. Pitch and roll are in longitudinal direction, and roll is in lateral direction. In longitudinal direction, there are two forces and one moment. The forces are an X-force and a Z-force. Moment M is a pitching moment. The forces and moment are represented as follow:

$$\dot{X} = Ax + Bu$$

With $$\begin{pmatrix} \dot{u} \\ \dot{\alpha} \\ \dot{q} \\ \dot{\theta} \end{pmatrix} = \begin{pmatrix} X_u & X_\alpha & 0 & g \\ Z_u & Z_\alpha & u_0 & 0 \\ M_u & M_\alpha & M_q & 0 \\ 0 & 0 & 1 & 0 \end{pmatrix} \begin{pmatrix} u \\ \alpha \\ q \\ \theta \end{pmatrix} + \begin{pmatrix} X_{\delta_e} & X_{\delta_t} \\ Z_{\delta_e} & Z_{\delta_t} \\ M_{\delta_e} & M_{\delta_t} \\ 0 & 0 \end{pmatrix} \begin{pmatrix} \Delta_{\delta_e} \\ \Delta_{\delta_t} \end{pmatrix}$$

Suppose a system with the following state space:

$$A = \begin{bmatrix} -.0163 & 9.5179 & 0 & -9.81 \\ -.1362 & -.0854 & 1 & 0 \\ 0 & -2.2604 & -2.341 & 0 \\ 0 & 0 & 1 & 0 \end{bmatrix} \text{ and}$$

$$B = \begin{bmatrix} 0 \\ -5.2708 \\ -51.4385 \\ 0 \end{bmatrix}$$

The transfer functions for velocity u, $G_{\delta_e}^\theta$, and for pitch angle θ, $G_{\delta_e}^u$, are as follow:

$$G_{\delta_e}^\theta = \frac{\theta}{\delta_e} = \frac{58.7s^2 + 5.528s + 75.866}{s^4 + 2.82s^3 + 4.13s^2 + 3.544s + 3.45} \quad (1)$$

$$G_{\delta_e}^u = \frac{u}{\delta_e} = \frac{5.27s^2 + 101.8s + 81.07}{s^4 + 2.82s^3 + 4.13s^2 + 3.544s + 3.45} \quad (2)$$

Next, system order reduction (see R. Prasad et al., "New Computing technique for order reduction of linear time invariant systems using stability equation method", Journal of the institution of Engineers IE(I) Journal EL, Vol. 86, September 2005, pp 133-135) is applied on both (1) and (2):

$$G_{\delta_e}^u = \frac{u}{\delta_e} = \frac{31}{s^3 + 1.05s^2 + 1.26125s + 1.2264} \quad (3)$$

$$G_{\delta_e}^\theta = \frac{\theta}{\delta_e} = \frac{27}{s^3 + 1.05s^2 + 1.26125s + 1.2264} \quad (4)$$

Now, to verify the solution, the UAV transfer function of θ will be solved using deadbeat equation. Solving for θ we get $$D_c D_s = s(s^3 + 1.05s^2 + 1.26s + 1.226) \quad (5)$$

$$D_c N_s H_2 = s(27) K_b \quad (6)$$

$$N_c N_s H_1 = K_3 (s^2 + Xs + Y)(27)(1 + K_1 s) \quad (7)$$

Now take $K_3 = 1$ (to be tuned later) as a starting value. If we further choose the desired settling time to be 2 seconds in the deadbeat equation, we can calculate the value of $\omega_n$, and the values of deadbeat parameters α, β, γ (found from deadbeat table below) are as follow:

$$\alpha = 2.2; \beta = 3.5; \gamma = 2.8$$

$$\omega_n = \frac{4.81}{.8(2)} = 3.00625$$

When we substitute this into the general Deadbeat equation, the characteristic equation of the deadbeat transfer function becomes:

$$G_{db} = s^4 + 6.6138s^3 + 31.6314s^2 + 76.0735s + 81.6778 \quad (8)$$

Applying deadbeat equation ($G_{db}$), i.e., making the parameters of each "s-power" equal, we find:

$$1.05 + 27*k1 = 6.6138 \quad (9)$$

$$1.26 + 27k1X + 27 = 31.631 \quad (10)$$

$$1.226 + 27(K_b + X + k1Y) = 76.0735 \quad (11)$$

$$27Y = 81.6771 \quad (12)$$

Solving the above set equations (9)-(12), we find:

$$K_1 = 0.214, K_b = 1.42, X = 0.7857, Y = 3.1414$$

After solving for the unknowns in the way shown above, $K_3$ was tuned and the final value was found to be 1. Next, the same PID solution is applied on both pitch angle (θ) and speed (u).

Figure 3:
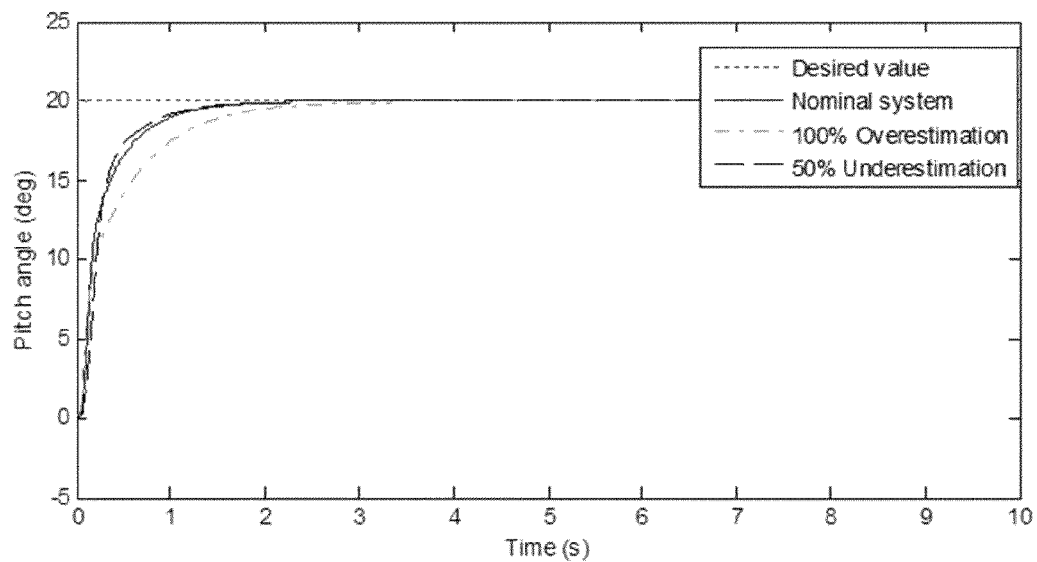
FIG. 3 shows the response of a small UAV used for research purposes to the set point of 20 degrees as desired pitch angle.
Figure 4:
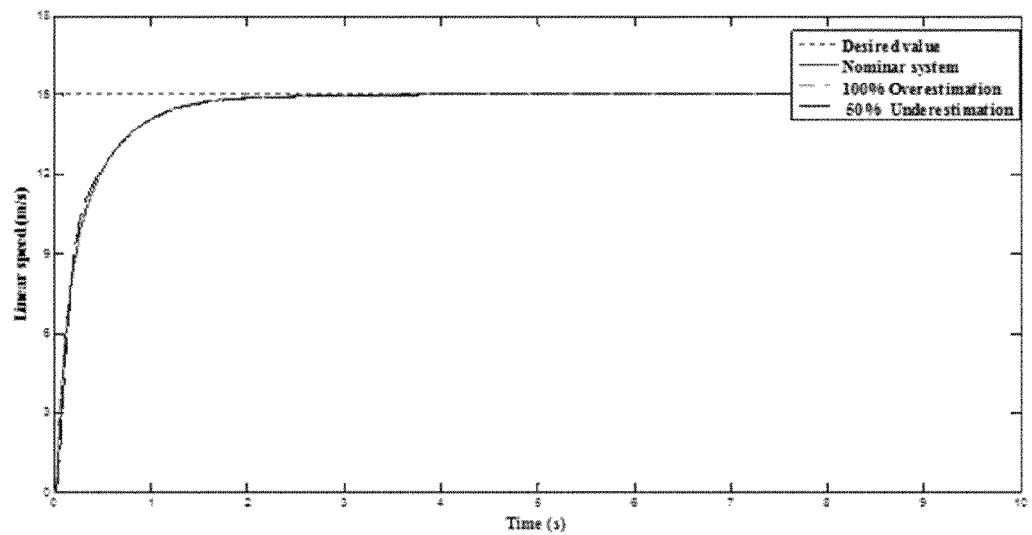
FIG. 4 shows the response for velocity with a set point of 15 m/s.
Figure 5:
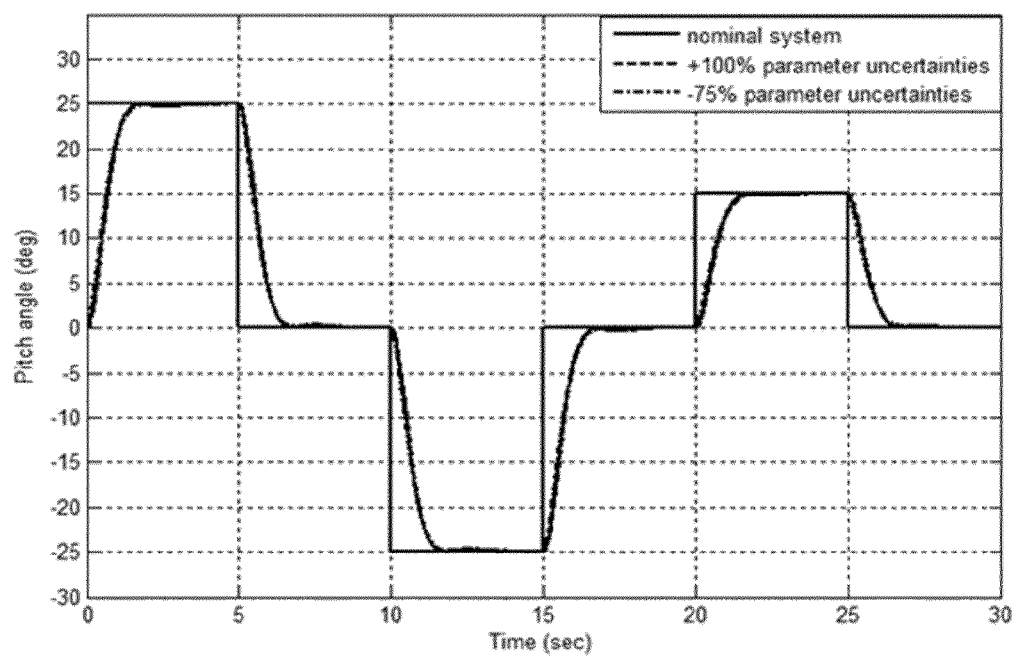
FIG. 5 shows the Pitch angle tracking.

FIG. 3 shows the response of the UAV to the set point of 20 degrees as desired pitch angle, while FIG. 4 shows the response for velocity with a set point of 15 m/s. FIG. 5 shows the Pitch angle tracking.

Remarks:
1—There is no overshooting
2—Settling time is as desired

System Robustness

System robustness can be tested by applying some changes on the system parameters. If the system remained stable with the same performance, then the system is robust against disturbance. FIGS. 3, 4 and 5 shows that the system remains stable after applying 100% overestimation and 50% underestimation to the original system.

System Optimality

System optimality can be shown in the solution since the gain $K_3$ needs to be tuned to reach optimum performance.

Controller Applied to MIMO Systems

Since the UAV system is MIMO system, the controller was successfully applied to the outputs θ and u.

Comparing with Other Similar Work:

The results were showing an oscillation and a settling time of 5 s as well as no reduction in the number of neither tuning parameters nor the control loops. In the current example, no oscillation is occurring, settling time is 2 s, a total reduction in the number of tuning parameters and loops of 96.5%.

Improvement:

The solution was applied on one PID instead of two PIDs. Which means that one PID controller was used to control both the pitch angle (θ) and speed (u). This improvement will minimize the decoupling effect of PIDs (the reason why PID controllers doesn't match the performance of other advanced controllers). Which will definitely enhance the system performance and decrease the cost as well as simplifying the control loop. By decreasing the number of tuning parameters, less time and man power as well as less experience is needed to tune the system.

Implementation:

The idea can be implemented on any system in a control loop. By following the steps below.

Again, assume a system with the state space illustrated above, with A and B as defined above (See K. Turkoglu, U. Ozdemir, M. Nikbay, E. Jafarov, "PID parameter optimization of a UAV longitudinal Flight control system", World Academy of Science, Engineering and Technology 45, 2008.), the transfer function for velocity and pitch angle are (again) as follow:

$$G_{\delta_e}^\theta = \frac{\theta}{\delta_e} = \frac{58.7s^2 + 5.528s + 75.866}{s^4 + 2.82s^3 + 4.13s^2 + 3.544s + 3.45} \quad (13)$$

$$G_{\delta_e}^u = \frac{u}{\delta_e} = \frac{5.27s^2 + 101.8s + 81.07}{s^4 + 2.82s^3 + 4.13s^2 + 3.544s + 3.45} \quad (14)$$

We first apply Zeros-gain replacement. In this method, all zeros (s-α)(s-β) . . . are replaced with one single gain K as follow:

$$G_{\delta_e}^\theta = \frac{\theta}{\delta_e} = \frac{K_\theta}{s^3 + 1.05s^2 + 1.26125s + 1.2264} \quad (15)$$

$$G_{\delta_e}^u = \frac{u}{\delta_e} = \frac{K_u}{s^3 + 1.05s^2 + 1.26125s + 1.2264} \quad (16)$$

In (13), (14) the order of denominator is 4, the difference between the denominator and the nominator is 4, using deadbeat:

$$H_1 = 1 + k_1 s + k_2 s^2 \quad (17)$$

Solving for the denominator of (15) or (16), we get:

$$D_c D_s = s(s^4 + 2.82s^3 + 4.13s^2 + 3.544s + 3.45) \quad (18)$$

$$D_c N_s H_2 = s(K)K_b \quad (19)$$

$$N_c N_s H_1 = K_3(S^2 + Xs + Y)(K)(1 + K_1 s + K_2 s^2) \quad (20)$$

Take $K_3 = 1$ (to be tuned later)

If we select the desired settling time as 2 seconds, we get the following deadbeat parameters (see deadbeat table below, from J. Dawes, L. Ng, R. Dorf, and C. Tam, "Design of deadbeat robust systems," Glasgow, UK, pp1597-1598, 1994)

| Order $n_p$ | A | β | γ | δ | ε | $T_{r90_n}$ | $T_{S_n}$ |
|---|---|---|---|---|---|---|---|
| $2^{nd}$ | 1.82 | — | — | — | — | 3.47 | 4.82 |
| $3^{rd}$ | 1.90 | 2.20 | — | — | — | 3.48 | 4.04 |
| $4^{th}$ | 2.20 | 3.50 | 2.80 | — | — | 4.16 | 4.81 |
| $5^{th}$ | 2.70 | 4.90 | 5.40 | 3.40 | — | 4.84 | 5.43 |
| $6^{th}$ | 3.15 | 6.50 | 8.70 | 7.55 | 4.05 | 5.49 | 6.04 |

$$\alpha_1 = 2.7; \alpha_2 = 4.95; \alpha_3 = 5.4; \alpha_4 = 3.4$$

Where K denotes $K_\theta$ or $K_u$ $$\omega_n = \frac{5.43}{.8(2)} = 3.3938$$

The deadbeat characteristic equation becomes as follow $$G_{db} = s^4 + 9.1631s^3 + 56.4359s^2 + 211.0733s + 451.0226 \quad (21)$$

By setting the parameters of each power of s of equation (21) and of equations 18)-(20) equal, the following system of nonlinear equations should be solved to get all the gains K, X and Y:

$$(K*K_2+2.82)=9.1631 \quad (22)$$

$$(K*K_1+K*K_2*X+4.125)=56.4359 \quad (23)$$

$$(K+K*K_1*X+K*K_2*Y+3.544)=211.0733 \quad (24)$$

$$(K*K_b+K*X+K*K_1*Y+3.45)=451.0226 \quad (25)$$

$$K*Y=450.1935 \quad (26)$$

The solution of (22)-(26) with selection of K=30 (after optimizing for K, the best value was found to be 30) yields $$K_1=1.296, K_b=-6.645, K_2=0.2114, X=2.118, Y=15.01$$

Figure 6:
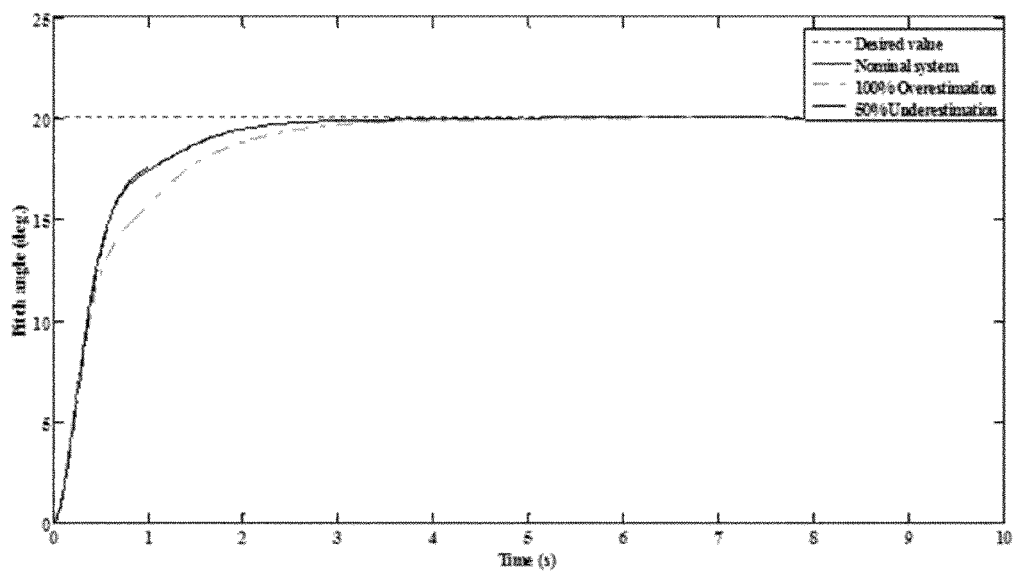
FIG. 6 shows the response of the UAV, using two method, order reduction and zero gain replacement.
Figure 7:
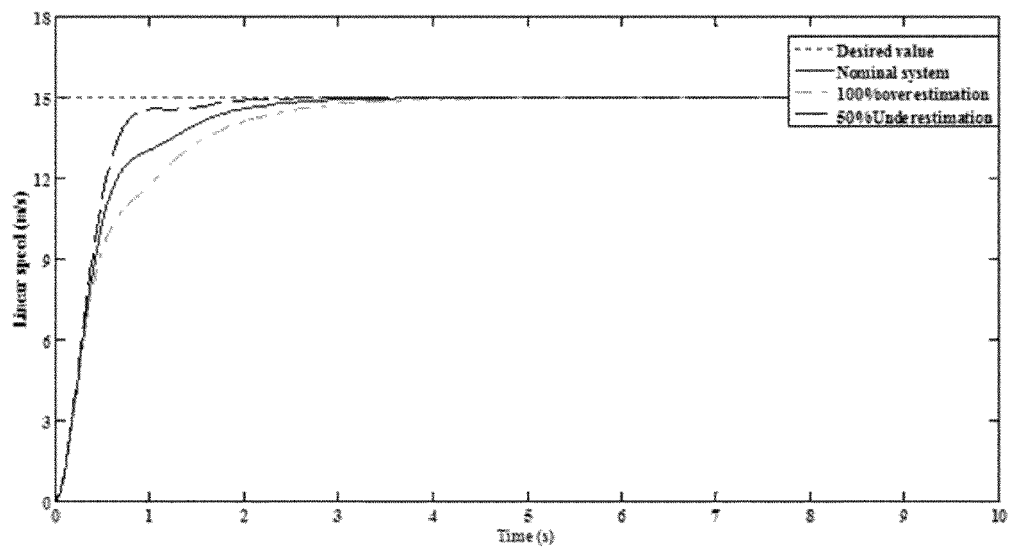
FIG. 7 shows the response for velocity with a set point of 15 m/s The drawings are not necessarily on scale

After solving for the unknowns, $K_3$ was tuned and the final value was found to be 1. Afterwards, the same PID solution is applied on both pitch angle ($\theta$) and speed (u) FIG. 6 shows the response of the UAV to the set point of 20 degrees as desired pitch angle, while FIG. 7 shows the response for velocity with a set point of 15 m/s Remarks
1—There is no overshooting
2—Settling time is as desired System Robustness System robustness can be tested by applying some changes on the system parameters. If the system remained stable with the same performance, then the system is robust against disturbance. FIGS. 6 and 7 show that the system remains stable after applying 100% overestimation and 50% underestimation to the original system.

System Optimality

System optimality can be shown in the solution since the gain $K_3$ needs to be tuned to reach optimum performance.

Controller Applied to MIMO Systems

Since the UAV system is a MIMO system, the controller was successfully applied to the outputs $\theta$ and u.

Comparing with Other Similar Work:

In the current example, no oscillation is occurring, settling time is 2 s, a total reduction in the number of tuning parameters and loops of 96.5%.

Improvement:

The solution was applied on one PID instead of two PIDs. Which means that here, one PID controller was used to control both the pitch angle ($\theta$) and speed (u). This improvement will minimize the decoupling effect of PIDs. This will definitely enhance the system performance and decrease the cost as well as simplifying the control loop.

It will also be clear that the above description and drawings are included to illustrate some embodiments of the invention, and not to limit the scope of protection. Starting from this disclosure, many more embodiments will be evident to a skilled person. These embodiments are within the scope of protection and the essence of this invention and are obvious combinations of prior art techniques and the disclosure of this patent.

The invention claimed is:

1. A method for controlling a continuous process, said method comprising:
providing a control system comprising a controller adapted for receiving an input set of at least two control input parameters and producing a set of at least two control output parameters in response to the at least two control input parameters, said control system arranged for effecting a modified deadbeat control, in which said modified deadbeat control comprises a robust deadbeat control for an n-th order, linear time invariant (LTI) system based upon a series of cascade proportional integrating-differentiating (PID) controls, each PID control comprising a system transfer function having a nominator and a denominator, wherein for the nominator a constant gain (K) is selected for each PID control;
providing a chemical processing assembly running a chemical process, said chemical process assembly comprising a series of actuators for setting a series of process conditions of said chemical process;
determining during said chemical process a series of process output parameters and providing these output parameters to the control system;
said control system determining a set of process input parameters resulting from said process output parameters;
said control system providing said input parameters to said actuators during said chemical process for setting said process conditions.

2. The control system of claim 1, wherein the denominator is set functionally equal for each PID control.

3. The control system of claim 1, wherein for each PID control, the gain (K) is set functionally equal.

4. The control system of claim 1, wherein at least one PID control is provided for each input.

5. The control system of claim 1, wherein said control system comprises a continuous time base.

6. The control system of claim 1, wherein the system transfer functions of said PID controls are defined as q(s)/p(s), wherein q(s) and p(s) are polynomials, wherein q(s) is selected as a constant gain K, and p(s) is a polynomial with deadbeat parameters.

7. The control system of claim 1, wherein said denominator is a polynomial.

8. The control system of claim 7, wherein said denominator is a Hurwitz polynomial.

9. The control system of claim 1, wherein said control system comprises a disturbance d(t) which is a function of time, and a size of said disturbance is less or equal to a maximum disturbance dmax.

10. The control system of claim 1, wherein the same PID is used in each loop, minimizing the decoupling effect.

11. The method of claim 1, wherein said chemical process is a continuous polyolefin polymerization reaction.

12. The method of claim 1, wherein actuators are selected from the group consisting of a material feeder, a cooler, a heater, and one or more pressure valves.

13. The method of claim 1, wherein said process output parameters are selected from the group consisting of temperature, pressure, flow rate, viscosity, molecular weight, one or more UV, VIS or IR spectral values, branching index, and a combination thereof.

* * * * *